United States Patent
Yang et al.

(10) Patent No.: US 10,563,336 B2
(45) Date of Patent: Feb. 18, 2020

(54) INNER TUB OF WASHING MACHINE

(71) Applicant: QINGDAO HAIER WASHING MACHINE CO., LTD., Shandong (CN)

(72) Inventors: Lin Yang, Shandong (CN); Hu Ji, Shandong (CN); Zunan Liu, Shandong (CN); Lingchen Wang, Shandong (CN); Guofang Zhu, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/762,242

(22) PCT Filed: Sep. 14, 2016

(86) PCT No.: PCT/CN2016/099029
§ 371 (c)(1),
(2) Date: Mar. 22, 2018

(87) PCT Pub. No.: WO2017/050173
PCT Pub. Date: Mar. 30, 2017

(65) Prior Publication Data
US 2018/0266031 A1    Sep. 20, 2018

(30) Foreign Application Priority Data

Sep. 22, 2015 (CN) .......................... 2015 1 0608264

(51) Int. Cl.
*D06F 37/12*    (2006.01)
*D06F 37/26*    (2006.01)
(Continued)

(52) U.S. Cl.
CPC .............. *D06F 37/12* (2013.01); *D06F 37/26* (2013.01); *D06F 39/083* (2013.01); *D06F 39/10* (2013.01); *D06F 37/00* (2013.01); *D06F 37/245* (2013.01)

(58) Field of Classification Search
CPC .......... D06F 37/02; D06F 37/12; D06F 37/24; D06F 37/245; D06F 39/10
See application file for complete search history.

(56) References Cited

U.S. PATENT DOCUMENTS 2,718,772 A * 9/1955 Sharp ...................... D06F 37/00
                                                      68/23.4
2,959,966 A * 11/1960 Bochan .................. D06F 23/04
                                                      403/51
(Continued)

FOREIGN PATENT DOCUMENTS

CN    201006953 Y    1/2008
CN    201165612 Y    12/2008
(Continued)

OTHER PUBLICATIONS

Machine translation of JPH09783A to Michinaga et al., 1997. (Year: 1997).*
(Continued)

*Primary Examiner* — Joseph L. Perrin
(74) *Attorney, Agent, or Firm* — Buchanan Ingersoll & Rooney PC

(57) ABSTRACT

The inner tub of a washing machine comprises a tub body, a balancing ring at the upper part of the tub body and a tub bottom at the lower part of the tub body. An annular necking structure, whose inside diameter is smaller than that of the tub body, is arranged on the tub body and positioned below the balancing ring, a plurality of dewatering holes are distributed at the necking structure and/or between the necking structure and the balancing ring. A disconnected
(Continued)

type filtering cover on the internal wall of the tub body and positioned below the necking structure comprises a main body and an auxiliary block, the auxiliary block is arranged above the main body and below the necking structure and is located at the upper part of the inner tub, and a water passing gap is arranged between the auxiliary block and the main body.

12 Claims, 6 Drawing Sheets

(51) Int. Cl.
  *D06F 37/24* (2006.01)
  *D06F 39/10* (2006.01)
  *D06F 39/08* (2006.01)
  *D06F 37/00* (2006.01)

(56) References Cited

U.S. PATENT DOCUMENTS

| | | | | |
|---|---|---|---|---|
| 2,971,546 A * | 2/1961 | Gaugler | ............... | B04B 7/08 |
| | | | | 141/11 |
| 3,132,098 A * | 5/1964 | Bochan | ............... | D06F 49/06 |
| | | | | 210/365 |
| 3,184,933 A * | 5/1965 | Gaugler | ............... | D06F 37/145 |
| | | | | 134/188 |
| 3,216,226 A * | 11/1965 | Alger | ............... | D06F 37/304 |
| | | | | 310/166 |
| 3,269,544 A * | 8/1966 | Brucken | ............... | D06F 37/24 |
| | | | | 210/364 |
| 3,314,257 A * | 4/1967 | Fosler | ............... | D06F 13/04 |
| | | | | 464/47 |
| 3,422,957 A * | 1/1969 | Fosler | ............... | B04B 9/146 |
| | | | | 200/33 R |
| 3,603,118 A * | 9/1971 | Brucken | ............... | D06F 23/04 |
| | | | | 68/174 |
| 5,271,251 A * | 12/1993 | Kovich | ............... | D06F 35/006 |
| | | | | 68/171 |
| 7,757,324 B2 * | 7/2010 | Leidig | ............... | D06F 37/14 |
| | | | | 68/12.12 |
| 9,428,853 B2 * | 8/2016 | Kim | ............... | D06F 23/04 |
| 2010/0326141 A1 * | 12/2010 | Chung | ............... | D06F 23/04 |
| | | | | 68/23.2 |
| 2011/0247373 A1 * | 10/2011 | Sharp | ............... | D06F 23/04 |
| | | | | 68/131 |
| 2014/0102154 A1 * | 4/2014 | Lee | ............... | D06F 39/10 |
| | | | | 68/18 F |

FOREIGN PATENT DOCUMENTS

| | | |
|---|---|---|
| CN | 202157198 U | 3/2012 |
| CN | 104452184 A | 3/2015 |
| JP | 54-120959 A | 9/1979 |
| JP | 09-783 A | 1/1997 |

OTHER PUBLICATIONS

International Search Report (PCT/ISA/210) dated Dec. 2, 2016, by the State Intellectual Property Office of the P.R. China as the International Searching Authority for International Application No. PCT/CN2016/099029.

Written Opinion (PCT/ISA/237) dated Dec. 2, 2016, by the State Intellectual Property Office of the P.R. China as the International Searching Authority for International Application No. PCT/CN2016/099029.

* cited by examiner

INNER TUB OF WASHING MACHINE

TECHNICAL FIELD

The present disclosure relates to the field of washing machines and particularly relates to an inner tub of a washing machine.

BACKGROUND

The existing washing machines comprise a hole-free inner tub washing machine. An entire inner tub employs a closed water containing design, only a circle of dewatering holes are formed in a tub wall below a balancing ring, the middle and lower part of the tub wall of the inner tub is not provided with hollow small holes for spinning off water any more. Water for washing and rinsing are completely centralized in the inner tub, thus, the inner tub serves as a water-containing washing tub and also serves as a centrifugal dewatering tub, and an outer tub of the washing machine actually only serves as a passage for collecting water spun off during the dewatering of the hole-free inner tub. According to different water discharge modes, the washing machines are divided into washing machines of two kinds of structures, i.e., a tub bottom of an inner tub of a washing machine of one kind of structure is provided with a water discharge port and a tub bottom of an inner tub of a washing machine of the other kind of structure is completely sealed. For the washing machine, of which the tub bottom is provided with the water discharge port, the inner tub firstly discharges a majority of water through the water discharge port during dewatering. During centrifugal dewatering, the inner tub rotates at a high speed, and water remaining in clothing moves upwards along the tub wall of the hole-free inner tub under the action of a centrifugal force, is spun into the outer tub through a circle of dewatering holes distributed below a tub opening and the balancing ring, is collected to a drainage pipe at the bottom of the outer tub through an outer tub wall and is discharged out of the machine. For the washing machine, of which the tub bottom is completely sealed, the water in the inner tub is discharged from a circle of dewatering holes in the upper part of the tub wall through controlling the rotating speed of the inner tub, and thus, the dewatering mode is the same as the above-mentioned mode. According to the washing machines, the water in a sandwich of the inner and outer tubs of the traditional washing machines is saved, so that the average water saving effect can reach 50% or more.

A hole-free inner tub water-saving washing machine is disclosed by a Chinese patent of an application number CN201120200858.4 and comprises a control seat, a tank body, a hole-free washing inner tub, a pulsator, a water containing tub, a driving system and a control system. The control seat is mounted on the tank body, the control seat is provided with the control system, the water containing tub is suspended in the tank body, the hole-free washing inner tub is mounted in the water containing tub, the pulsator is mounted in the hole-free washing inner tub, the driving system is connected with the hole-free washing inner tub and the pulsator. A tub body of the hole-free washing inner tub is free of water outlet holes, the upper part of the hole-free washing inner tub is provided with the water outlet holes, and the bottom of the hole-free washing inner tub is provided with a centrifugal type drainage structure.

However, during washing, the washing water in the inner tub of the above-mentioned washing machine is subjected to whirling and surging under the intense reciprocating stirring of the pulsator, part of the washing water is splashed into the outer tub through the dewatering holes below the balancing ring due to a surging action. The washing machine will be subjected to water loss in case of a serious splashing phenomenon, in order to maintain a washing water level, the washing machine must carry out automatic water replenishing at intervals, splashed water vainly flows out of the machine through the drainage pipe of the outer tub, the volume of a detergent in the inner tub will be reduced due to water loss even if water is replenished, the cleaning ratio is lowered, and the market fame of the washing machine is directly affected by the phenomenon.

In order to reduce splashed water loss of the hole-free washing machine during washing, Chinese patent application number CN200820003576.3 discloses a surging preventing type balancing ring system of a hole-free washing machine. An overflow passage of a lower slit, a water containing chamber and an upper slit is formed by a surging preventing type balancing ring and a hole-free inner tub in a matched manner and also acts as dewatering holes during dewatering, and the object of preventing or reducing the splashed water loss of the hole-free washing machine during washing is achieved in a surging delaying mode.

However, the design structure does not have an ideal blocking action on water flow during washing, water of water flow entering the overflow passage will be directly splashed from the passage due to relatively high inertia under the action of a centrifugal force. Discovered by test, the improved structure can only block off a minority of water from being splashed out of the tub, and the problem of splashed water loss of the washing machine cannot be solved; secondly, the overflow passage of this design is not easy to wash, the interior of the passage is prone to scale hiding and bacterium multiplying when washing water flow passes through the passage, and microbes such as bacteria will be brought when the water enters the overflow passage and the minority of water flows back to the hole-free inner tub; and next, due to the structure, during dewatering, the dewatering efficiency is affected by delayed surging, so that this technology still has serious defects in view of the aspects of water saving, dewatering effect and safety and health.

In view of this, the present disclosure is provided.

SUMMARY

A technical problem to be solved by the present disclosure is to overcome the defects in the prior art and provide an inner tub of a washing machine. During the clothing washing of the washing machine, washing water is effectively prevented from rising along a tub wall and overflowing from the dewatering holes, and thus, the defect that the washing machine is poor in water saving effect is overcome.

In order to solve the technical problem described above, a basic concept of a technical solution of the present disclosure is as follows:

an inner tub of a washing machine comprises a tub body, a balancing ring mounted at the upper part of the tub body and a tub bottom mounted at the lower part of the tub body; wherein an annular necking structure, of which the inside diameter is smaller than that of the tub body, is arranged on the tub body and positioned below the balancing ring; a plurality of dewatering holes are distributed at the necking structure and/or between the necking structure and the balancing ring, and the middle-lower part of the tub body is of a sealed water containing structure.

According to the present disclosure, the washing machine adopts the inner tub structure, during washing, particularly high-water-level washing, even if washing water rises along a tub wall due to a centrifugal force of washing, the washing water will be blocked off at the necking structure and fall back into the tub. Thus, the washing water can be effectively prevented from climbing along the tub wall and overflowing from the dewatering holes above, and defects such as poor clothing washing effect and low cleaning ratio caused by water loss are avoided. And during dewatering, the inner tub has a relatively high rotating speed, so that the generated centrifugal force still can enable the washing water to be discharged from the dewatering holes above.

Further, the necking structure is an annular bulge formed in the internal wall of the tub body in a manner that the tub body is dented from outside to inside, or the necking structure is an annular convex rib which is arranged on the internal wall of the tub body along the circumference.

One forming mode of the necking structure is as follows: the annular bulge is formed in the internal wall of the tub body in a manner that the tub body is dented from outside to inside, and thus, the inner tub is simple in structure and convenient to process. And another forming mode of the necking structure is as follows: the annular convex rib is arranged on the internal wall of the tub body along the circumferential direction, thus, the strength of the inner tub is improved, and the service life of the inner tub is prolonged.

Further, the lower end of the necking structure and the internal wall of the tub body are of inverted slope arrangement.

Due to the inverted slope arrangement, washing water, which climbs along the inner tub under the action of a centrifugal force during washing, can flow back into the inner tub at the structure without being accumulated at this position; and during dewatering, the inner tub rotates at a high speed, and thus, water obtained by dewatering can upwards climb to dewatering holes along the necking structure to be discharged.

Further, the dewatering holes are divided into at least two layers in the axial direction of the tub body, and the distribution density of the upper-layer dewatering holes is greater than that of the lower-layer dewatering holes.

The dewatering holes are divided into an upper dense layer and a lower sparse layer in the axial direction, and thus, water obtained by dewatering is conveniently discharged when the water content of clothing is relatively low at a later stage of dewatering; and in addition, due to the lower-layer dewatering holes with low distribution density, the overflow of the washing water from the lower-layer dewatering holes during high-water-level washing can be reduced.

Further, the dewatering holes are formed in the upper half part of the necking structure, or the dewatering holes are formed in an area above a part, with the minimum inside diameter, of the necking structure. The dewatering holes are formed in the necking structure, so that water loss of the inner tub caused due to the fact that part of the washing water upwards climbs and then is discharged into an outer tub can be further avoided.

Further, the balancing ring is provided with an annular convex rib which bulges towards the periphery, the upper end part of the necking structure turns up outwards and is in wrapping connection with the annular convex rib, the dewatering holes are formed below the annular convex rib, and preferably, the necking structure turns up outwards along the uppermost sides of the dewatering holes and is in wrapping connection with the annular convex rib.

Due to the dewatering holes, the speed of discharging of water obtained by dewatering is increased, the dewatering rate is increased, and the condition that part of un-discharged water climbing along a tub wall of an inner tub falls back and infiltrates into clothing again after a rotating speed of the inner tub is lowered is avoided.

Further, an annular rib which is downwards inserted into the necking structure is arranged at the lower end of the balancing ring, a gap is reserved between the annular rib and the internal wall of the necking structure and forms a dewatering passage, and the dewatering holes are formed in the part, close to the top end of the dewatering passage, of the necking structure.

Further, the dewatering passage comprises a plurality of longitudinally-arranged channels, and the dewatering holes are formed in the upper parts of the channels.

Further, the channels are mainly formed in a manner that longitudinal ribs, which are longitudinally distributed on the annular rib, are matched with the necking structure.

By the above-mentioned structure, splashed water resulting from rotation of an inner tub during washing can be prevented from being discharged from the dewatering holes, meanwhile, water discharge is guided during dewatering, and the condition that the dewatering efficiency is lowered due to the fact that water obtained by dewatering moves along the circumference of a tub wall and affects a water discharge speed is prevented.

Further, a disconnected type filtering cover is arranged on the internal wall of the tub body and positioned below the necking structure and comprises a main body and an auxiliary block, the auxiliary block is arranged above the main body and below the necking structure and is located at the upper part of the inner tub, and a water passing gap which is used for enabling water flow to pass through along a rotating direction of the inner tub is arranged between the auxiliary block and the main body.

Due to the disconnected type filtering cover, the condition that water loss is caused due to the fact that washing water upwards climbs to the dewatering holes of the necking structure along the filtering cover under the action of a centrifugal force during washing can be avoided; and in addition, splashed water, caused by collision between the washing water and the filtering cover during washing, overflowing from the dewatering holes can be reduced.

Further, third dewatering holes are formed in the tub body and positioned behind the auxiliary block. Due to the third dewatering holes behind the auxiliary block, water can be conveniently discharged when the water content of clothing is relatively low at a later stage of dewatering, and the dewatering efficiency of the washing machine is increased; and in addition, the dewatering efficiency can also be guaranteed during low-water-level dewatering.

Further, a continuous type filtering cover is arranged on the internal wall of the tub body and positioned below the necking structure, and a water passing gap which is used for enabling water flow to pass through along a rotating direction of the inner tub is arranged between the continuous type filtering cover and the necking structure.

Due to a design structure that the water passing gap is formed between the continuous type filtering cover and the necking structure, the overflow of the washing water from the dewatering holes in the upside of the necking structure through climbing along the continuous type filtering cover can be reduced.

Further, no dewatering hole is formed just above the filtering cover nor within an $\alpha$ range at each of the two sides of the filtering cover, and $\alpha$ is greater than or equal to 0 degree and is smaller than or equal to 20 degrees. Due to the structure, the water is prevented from splashing, directly rising along the filtering cover and overflowing from the dewatering holes above, and thus, the water blocking efficiency is farther increased.

Further, a continuous type filtering cover is arranged on the internal wall of the tub body and positioned below the necking structure, no dewatering hole is formed just above the filtering cover nor within an α range at each of the two sides of the filtering cover, and α is greater than or equal to 0 degree and is smaller than or equal to 20 degrees.

No dewatering hole is formed in a certain angle above the continuous type filtering cover, thus, the overflow of the washing water from the dewatering holes above through climbing along the continuous type filtering cover under the action of a centrifugal force during washing can be further reduced.

After adopting the above-mentioned technical scheme, compared with the prior art, the present disclosure has the following beneficial effects.

A hole-free inner tub of an existing washing machine is improved, a necking structure which is necked towards the interior of the tub is arranged at the upper part of the inner tub, a blocking boss with a water blocking action is formed on the necking structure, and thus, water in the tub can be prevented from outwards splashing during washing; at least two layers of dewatering holes are distributed and arranged at the necking structure and/or between the necking structure and a balancing ring, and thus, ideal dewatering efficiency can be achieved during dewatering; in order to further prevent the washing water from splashing during washing, a filtering cover mounted on the internal wall of a tub body is improved; due to the disconnected type filtering cover, a water passing gap in the circumferential direction is arranged between an auxiliary block and the filtering cover, so that the water is prevented from splashing and directly rising to the dewatering holes above the auxiliary block along the filtering cover; low-water-level dewatering holes are also formed behind the auxiliary block of the disconnected type filtering cover, so that the dewatering efficiency of low-water-level dewatering is guaranteed; and in order to prevent the washing water from rising or splashing along the filtering cover during washing, no dewatering hole is formed in a certain range just above the filtering cover, and thus, water loss is further reduced.

According to the present disclosure, a matched mounting mode of the balancing ring and the necking structure is further improved, layout design of the dewatering holes is optimized, water loss caused by splashing during washing is reduced, and meanwhile, the water discharge speed and dewatering efficiency during dewatering are increased.

The specific embodiments of the present disclosure are further described in detail below with reference to the drawings.

BRIEF DESCRIPTION OF THE DRAWINGS

As one part of the present disclosure, the drawings are used for providing further understanding for the present disclosure; and schematic embodiments and descriptions thereof of the present disclosure are used for explaining the present disclosure without forming improper restriction to the present disclosure. Apparently, the drawings described below are only some embodiments, and other drawings can be obtained by those having ordinary skill in the art according to these drawings on the premise of not making inventive labor. In the drawings.

Figure 1:
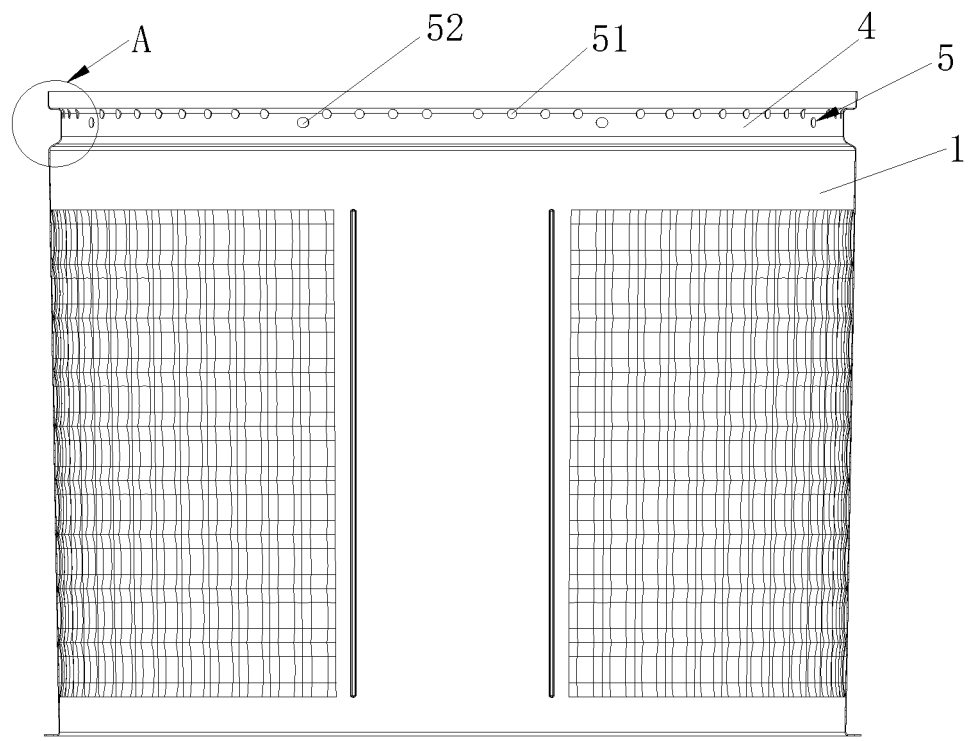
FIG. 1 is a structural schematic diagram of a tub body of an inner tub of the present disclosure.

It is necessary to note that these drawings and word descriptions are not aimed at restricting the concept scope of the present disclosure in any way, but declaring the conception of the present disclosure to those skilled in the art through referring to specific embodiments.

DETAILED DESCRIPTION

In order to make objects, technical schemes and advantages of the embodiments of the present disclosure clearer, the technical schemes of the embodiments are clearly and completely described below with reference to the drawings of the embodiments of the present disclosure; and the following embodiments are used for describing the present disclosure, but not limiting the scope of the present disclosure.

In the description of the present disclosure, it is necessary to note that orientation or position relationships indicated by terms such as 'up', 'down', 'front', 'back', 'left', 'right', 'vertical', 'interior' and 'exterior' are orientation or position relationships shown on the basis of the drawings, are only used for conveniently describing the present disclosure and simplifying description without indicating or suggesting that appointed devices or elements must have specific orientations or be constructed and operated at the specific orientations, therefore, the terms cannot be understood to limit the present disclosure.

In the description of the present disclosure, it is necessary to note that except for additional definite provision and restriction, terms such as 'mounting', 'connection' and 'connecting' should be generally understood, for example 'connection' may be fixed connection, detachable connection or integrated connection; 'connection' may be mechanical connection or electric connection; and 'connection' may be direct connection or intermediate-medium indirect connection. For those of ordinary skill in the art, the specific meanings of the above-mentioned terms in the present disclosure can be understood according to particular cases.

Referring to FIG. 1 to FIG. 11, an inner tub of a washing machine, provided by the present disclosure, comprises a tub body 1, a balancing ring 2 mounted at the upper part of the tub body 1 and a tub bottom 3 mounted at the lower part of the tub body 1, wherein an annular necking structure 4, of which the inside diameter is smaller than that of the tub body, is arranged on the tub body 1 and positioned below the balancing ring 2, a plurality of dewatering holes 5 are distributed at the necking structure 4 and/or between the necking structure 4 and the balancing ring 2, and the middle-lower part of the tub body 1 is of a sealed water containing structure.

During washing and rinsing, when washing water in the inner tub is subjected to swirling and splashing under the reciprocating stirring of a pulsator, the washing water will climb along a tub wall of the inner tub. When the washing water climbs to the annular necking structure 4 arranged below the balancing ring 2, as the inner tub is low in rotating speed during washing and rinsing, the washing water is blocked by the necking structure 4 due to a generated centrifugal force and falls back into the inner tub due to the action of gravity, and the upwards-splashing washing water is blocked by the necking structure 4. The middle-lower part of the tub body 1 is free of the dewatering holes and is of a sealed water containing structure, the washing water is prevented from overflowing through the dewatering holes, the overflow of the washing water of the washing machine caused by splashing is effectively prevented or reduced, and then, a water level is maintained during washing and rinsing. There is no need to install a water replenishing program in the washing machine, the increase of water consumption during washing and rinsing is avoided, and the defect that the washing machine is poor in water saving effect is overcome; and meanwhile, the problem that the washed clothes are not clean caused by lowered liquid detergent concentration due to water loss and water replenishing during washing is also avoided. During dewatering, the inner tub is very high in rotating speed, a greater centrifugal force is generated, water in the inner tub and clothing can climb to positions of the dewatering holes and is free of blocking influence caused by the necking structure, and thus, normal dewatering is achieved.

Embodiment I

Referring to FIG. 1 to FIG. 4, a necking structure 4 of an inner tub of a washing machine provided by embodiments of the present disclosure is an annular bulge formed in the internal wall of the tub body 1 by a circle of groove, in which the tub body 1 is dented from outside to inside. The necking structure 4 is simple in structure, the entire inner tub of the washing machine is not required to be additionally provided with other parts, and the inner tub is integrally simple to manufacture and low in cost.

Or, the necking structure is obtained through arranging an annular convex rib on the internal wall of the tub body along the circumference (not shown in the figures), and specifically, the necking structure is formed through changing the thickness of the tub body at this position or mounting a circle of convex rib on a tub wall.

Figure 2:
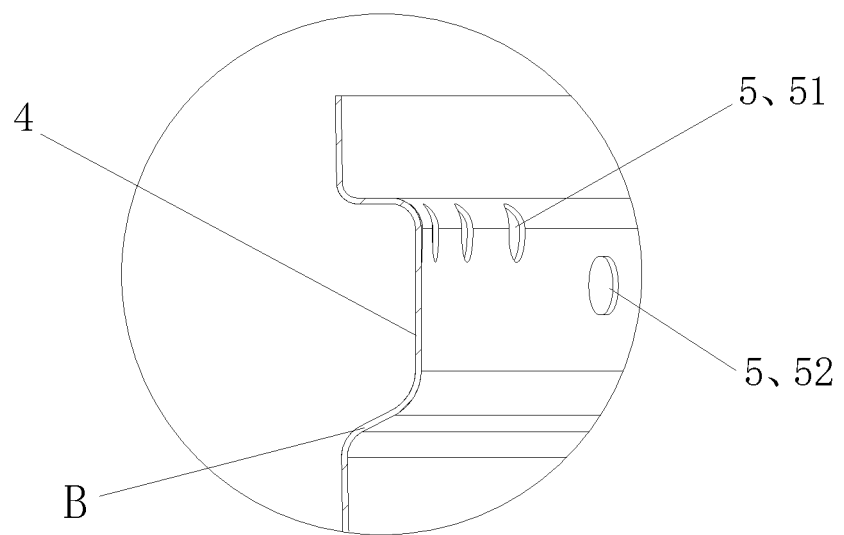
FIG. 2 is an enlarged schematic diagram of a part A in FIG. 1.

Preferably, the lower end of the necking structure 4 and the internal wall of the tub body 1 are of inverted slope arrangement (referring to a position B in FIG. 2). Due to the inverted slope arrangement, washing water, which climbs along the inner tub under the action of a centrifugal force during washing, can flow back into the inner tub at the structure; and during dewatering, the inner tub rotates at a high speed, and thus, water obtained by dewatering can upwards climb to dewatering holes along the necking structure to be discharged.

Embodiment II

Referring to FIG. 1 and FIG. 2, in this embodiment, two circles of dewatering holes 5, i.e., an upper circle of dewatering holes 5 and a lower circle of dewatering holes 5 are distributed at the necking structure 4. During the centrifugal dewatering of the washing machine, the inner tub rotates at a high speed, water remaining in clothing climbs along a tub wall of the inner tub under the action of a centrifugal force and is rapidly discharged through the dewatering holes 5, and thus, the dewatering efficiency is increased.

The distribution density of upper-layer dewatering holes 51 is greater than that of lower-layer dewatering holes 52, i.e. the quantity of the lower-layer dewatering holes 52 is smaller than that of the upper-layer dewatering holes 51 (referring to FIG. 1). By the structure, the condition that washing water may overflow from the dewatering holes during washing and rinsing is further avoided; and during the dewatering of the washing machine, due to the arranged lower-layer dewatering holes, the residual of water obtained by dewatering is avoided.

Further, the dewatering holes 5 are formed in the upper half part of the necking structure 4, or the dewatering holes 5 are formed in an area above a part, with minimum inside diameter, of the necking structure 4; and the structure can better prevent the washing water from flowing out of the dewatering holes.

In this embodiment, the necking structure 4 is provided with two circles of dewatering holes 5, i.e., the upper circle of dewatering holes 5 and the lower circle of dewatering holes 5, but is not restricted to being provided with two circles of dewatering holes, and can also be provided with only one circle of dewatering holes or three or more circles of dewatering holes; and the less the dewatering holes are formed, the lower the possibility of water loss of the inner tub during washing and rinsing is, and the more the dewatering holes are formed, the higher the dewatering speed is.

Embodiment III

Figure 3:
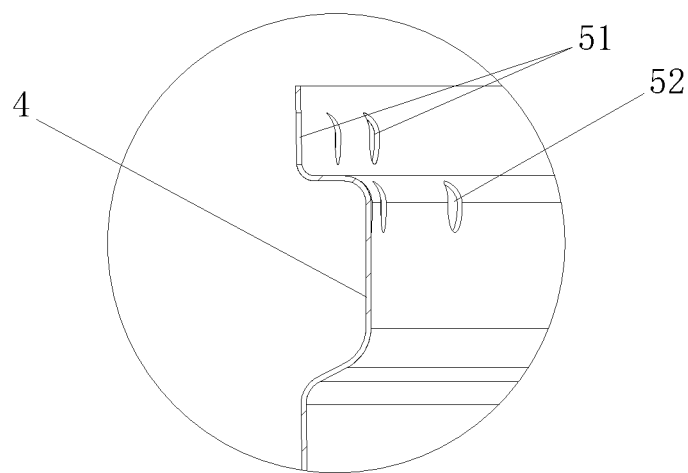
FIG. 3 is a schematic diagram of another dewatering hole forming mode of FIG. 2.

The difference between this embodiment and the embodiment II lies in that: dewatering holes are partially or completely formed in the part, above a necking structure and below a balancing ring, of a tub wall; and referring to FIG. 3, upper-layer dewatering holes 51 are formed above a necking structure 4, and lower-layer dewatering holes 52 are formed in the upper half part of the necking structure 4.

Embodiment IV

Figure 4:
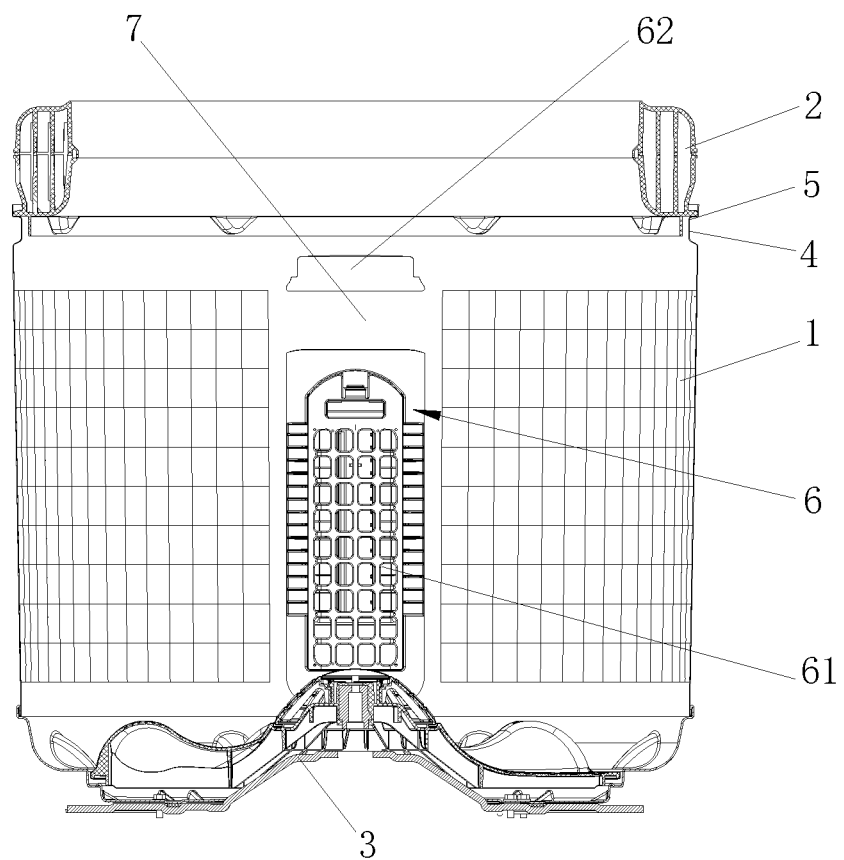
FIG. 4 is a mounting structural schematic diagram of an inner tub and a disconnected type filtering cover of the present disclosure.
Figure 5:
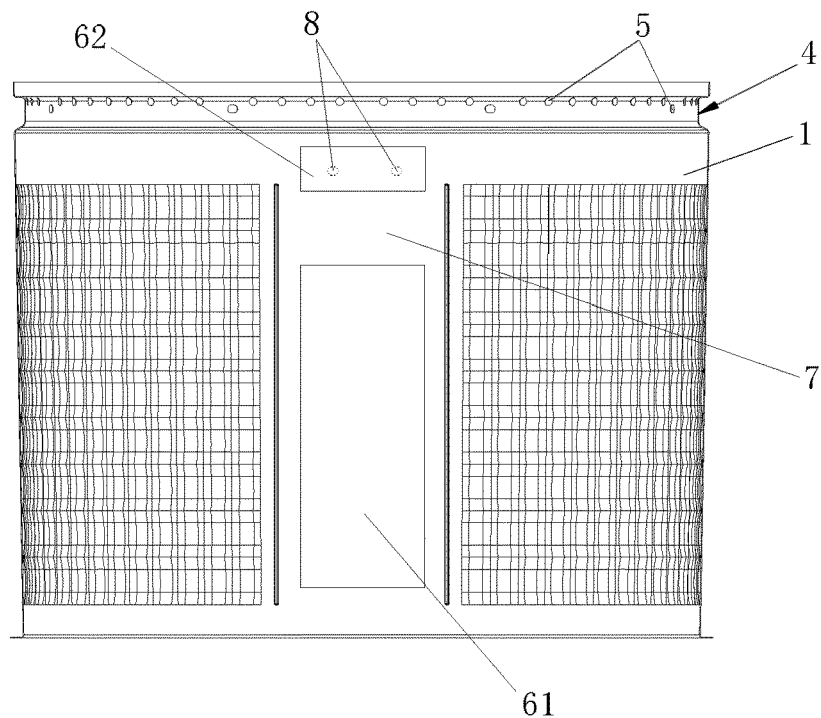
FIG. 5 and FIG. 6 are different mounting structural schematic diagrams of a disconnected type filtering cover and dewatering holes of the present disclosure.
Figure 6:
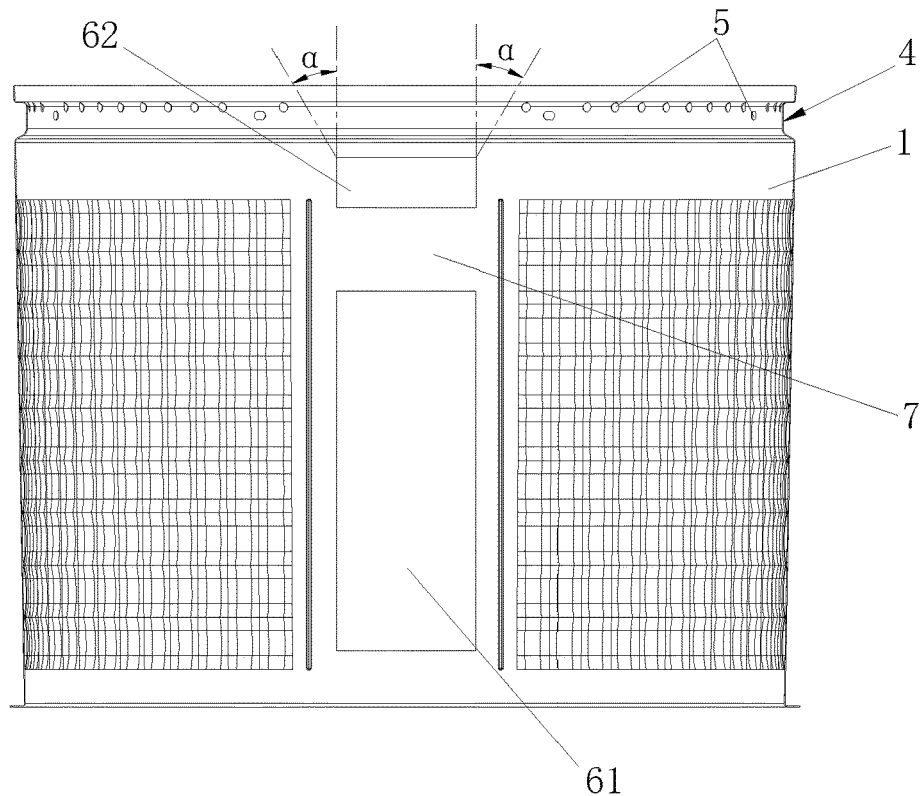

Referring to FIG. 4 to FIG. 6, according to the present disclosure, on the basis of the above-mentioned embodiments, a disconnected type filtering cover 6 is arranged on the internal wall of a tub body 1 and positioned below a necking structure 4 and comprises a main body 61 and an auxiliary block 62, the auxiliary block 62 is arranged above the main body 61, and a water passing gap 7 which is used for enabling water flow to pass through along a rotating direction of an inner tub is arranged between the auxiliary block 62 and the main body 61.

Due to the arrangement, during washing and rinsing, washing water in the inner tub climbs along the surface of the main body 61; due to the water passing gap 7 arranged between the auxiliary block 62 and the main body 61, the water is effectively prevented from continuously climbing along the filtering cover, and the possibility of overflowing of the washing water is lowered; and in addition, the passing ability of water flow during rotation is improved, and splashing caused by collision between the washing water and the filtering cover is reduced.

Embodiment V

Referring to FIG. 5, according to this embodiment, on the basis of the embodiment IV, in order to increase dewatering efficiency, particularly the dewatering efficiency of low-water-level washing, third dewatering holes 8 are formed in a tub body 1 and positioned behind an auxiliary block 62. Preferably, the auxiliary block 62 is arranged at the upper part of the tub body 1 and is arranged at an altitude higher than a set highest water level of a washing machine, and thus, the overflow of washing water during high-water-level washing is avoided.

Embodiment VI

Referring to FIG. 6, according to this embodiment, further improvement is made on the basis of the embodiment IV and the embodiment V, during washing, due to collision between washing water and a filtering cover, a small amount of washing water may directly splash to a necking structure 4 or a part between the necking structure 4 and a balancing ring 2 due to the action of an impact force, thus, the small amount of washing water overflows from dewatering holes distributed at the necking structure 4 and/or between the necking structure 4 and the balancing ring 2, and thus, the water-saving effect of the washing machine is poor. In order to avoid the condition that the overflow of the washing water may be caused, no dewatering hole is formed above the auxiliary block 62 nor in an area corresponding to an α range at each of the two sides of the auxiliary block 62, and α is greater than or equal to 0 degree and is smaller than or equal to 20 degrees, so that the overflow of the washing water caused by splashing during the clothing washing of the washing machine can be effectively prevented or reduced.

Embodiment VII

Figure 7:
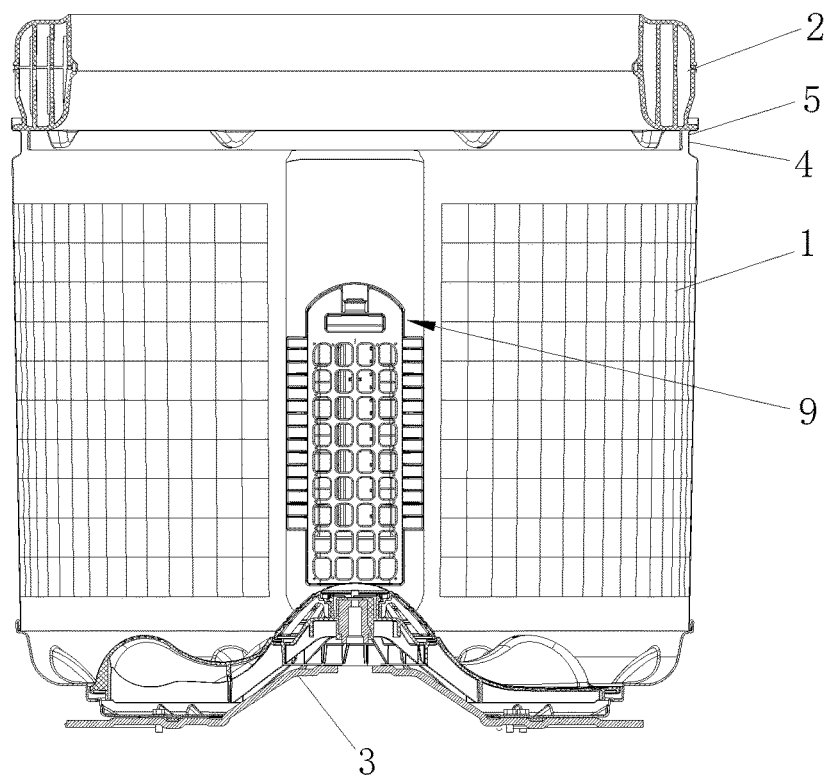
FIG. 7 and FIG. 8 are different mounting structural schematic diagrams of a continuous type filtering cover of the present disclosure.

Referring to FIG. 7, this embodiment is different from the above-mentioned embodiment IV, a continuous type filtering cover 9 is arranged on the internal wall of a tub body 1 and positioned below a necking structure 4, no dewatering hole is formed above the continuous type filtering cover 9 nor in an area corresponding to an α range at each of the two sides of the continuous type filtering cover 9, and α is greater than or equal to 0 degree and is smaller than or equal to 20 degrees, so that during washing and rinsing, washing water cannot overflow even if the washing water rises along the surface of the filtering cover; and during dewatering, an inner tub is relatively high in rotating speed, water obtained by dewatering also rotates in a circumferential direction of the internal wall when the water obtained by dewatering rises along the internal wall under the action of a centrifugal force, and the water can also be discharged from the dewatering holes in other areas even if no dewatering hole is formed above the continuous type filtering cover 9.

Embodiment VIII

Figure 8:
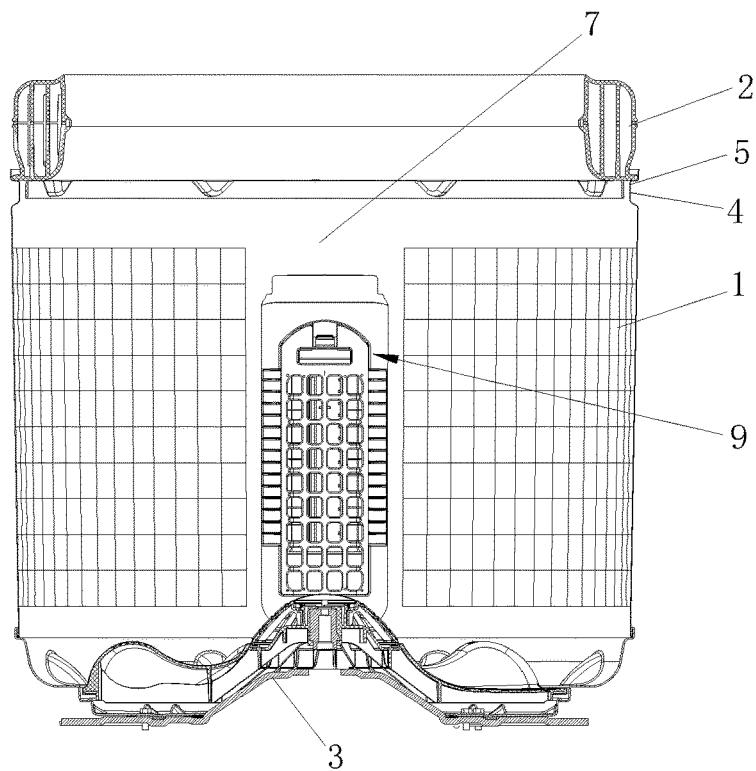

Referring to FIG. 8, in this embodiment, a continuous type filtering cover 9 is arranged on the internal wall of a tub body and positioned below a necking structure 4, and in order to further reduce the overflow of washing water, a water passing gap 7 which is used for enabling water flow to pass through along a rotating direction of an inner tub is arranged between the continuous type filtering cover 9 and the necking structure 4. This structure can be combined with the structure in the embodiment VII, and the overflow of the washing water during washing and rinsing can be better reduced.

Embodiment IX

Figure 9:
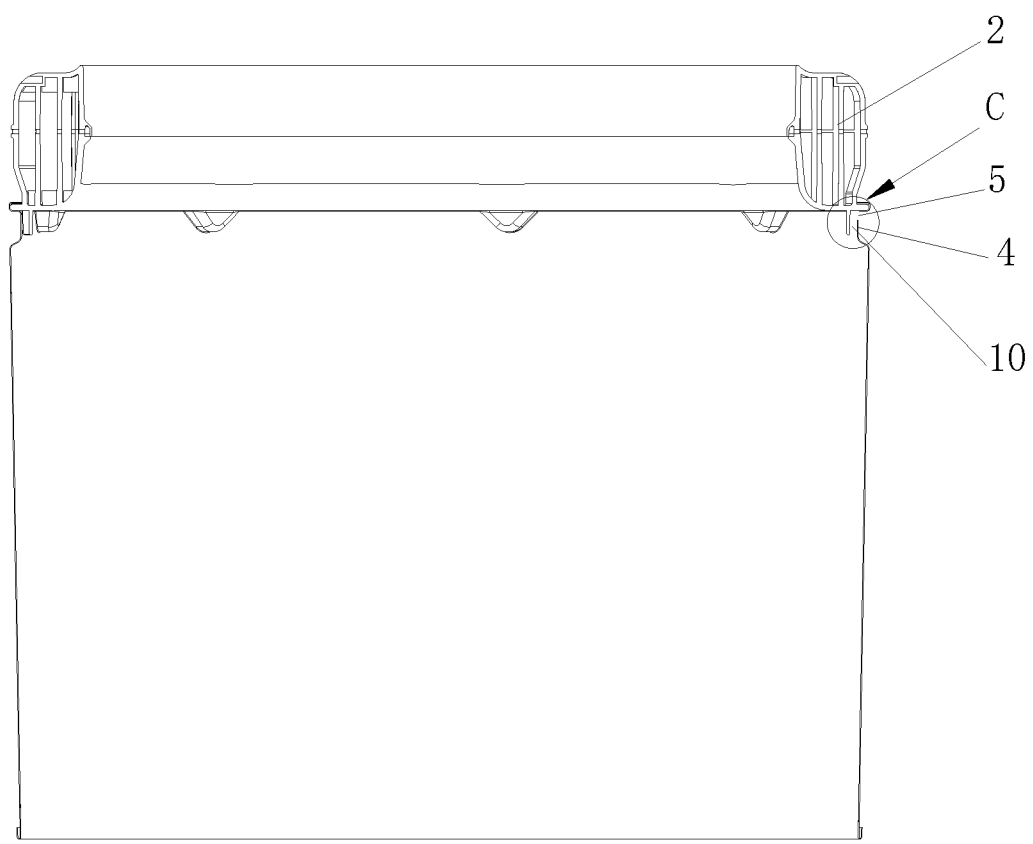
FIG. 9 and FIG. 10 are matched-mounting structural schematic diagrams of an inner tub and a balancing ring of the present disclosure.
Figure 11:
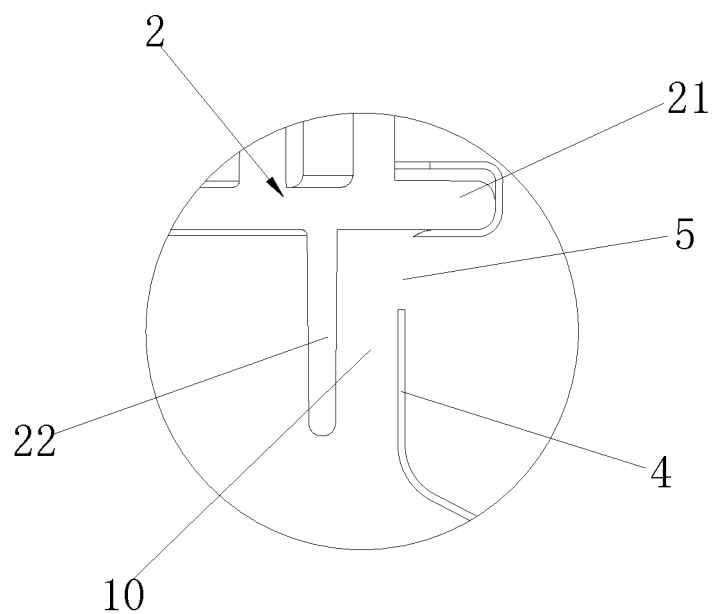
FIG. 11 is an enlarged schematic diagram of a part C in FIG. 9.

Referring to FIG. 9 and FIG. 11, in this embodiment, a balancing ring 2 is provided with an annular convex rib 21 which bulges towards the periphery, the upper end part of a necking structure 4 turns up outwards and is in wrapping connection with the annular convex rib 21, dewatering holes 5 are formed below the annular convex rib 21, and the uppermost sides of the dewatering holes 5 and the annular convex rib 21 are adjacently arranged.

Due to the dewatering holes, the speed of discharging of water obtained by dewatering is increased, the dewatering rate is increased, and the condition that part of un-discharged water climbing along a tub wall of an inner tub falls back and infiltrates into clothing again after a rotating speed of the inner tub is lowered is avoided.

Embodiment X

Figure 10:
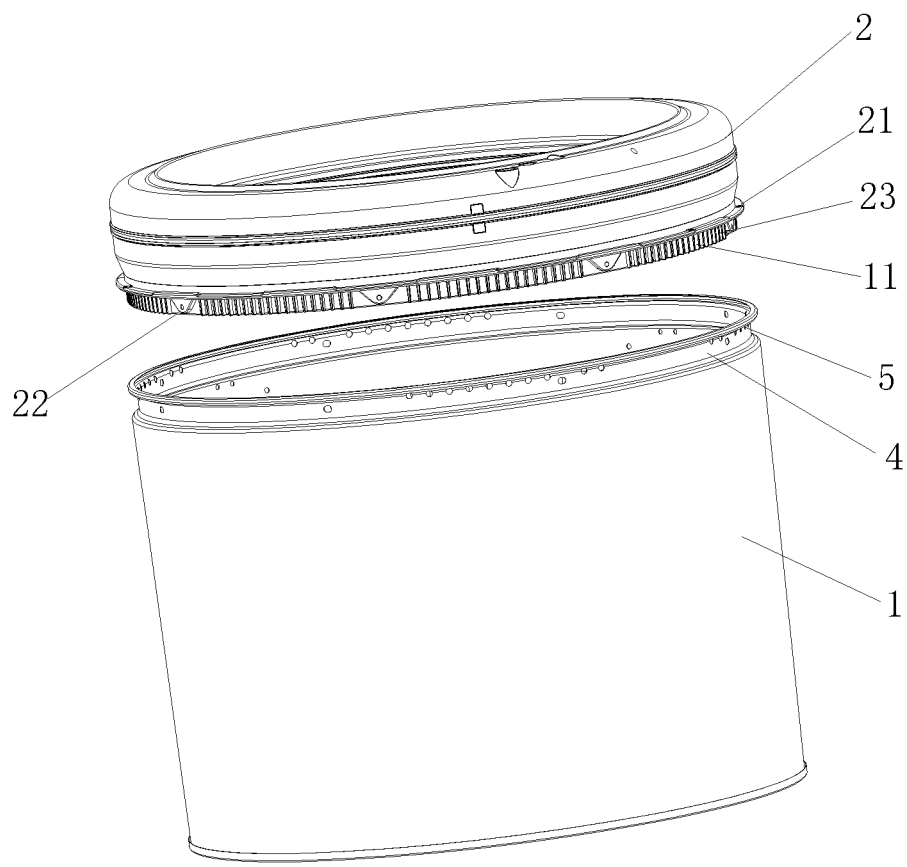

Referring to FIG. 10 and FIG. 11, in this embodiment, an annular rib 22 which is downwards inserted into a necking structure is arranged at the lower end of a balancing ring 2, a gap is reserved between the annular rib 22 and the internal wall of the necking structure 4 and forms a dewatering passage 10, and the dewatering holes 5 are formed in the part, close to the top end of the dewatering passage 10, of the necking structure 4.

Further, the dewatering passage 10 comprises a plurality of longitudinal-arranged channels 11, and the dewatering holes 5 are formed in the upper parts of the channels 11; and preferably, the dewatering holes 5 are formed in the necking structure 4 at the top ends of the channels 11. The channels 11 are mainly formed in a manner that longitudinal ribs 23, which are longitudinally distributed on the annular rib 22, are matched with the necking structure 4, or are formed in a manner that bulges, which are longitudinally distributed on the internal wall of the necking structure, are matched with the annular rib (not shown in the figure).

By the above-mentioned structure, splashed water resulting from rotation of an inner tub during washing can be prevented from being discharged from the dewatering holes, meanwhile, water discharge is guided during dewatering, and the condition that the dewatering efficiency is lowered due to the fact that water obtained through dewatering moves along the circumference of a tub wall and affects a water discharge speed is prevented.

The above-mentioned embodiments are only preferred embodiments of the present disclosure, but not intended to limit the present disclosure in any form. Although the preferred embodiments of the present disclosure are disclosed above, the preferred embodiments are not intended to limit the present disclosure. Equivalent embodiments, of which some changes or modifications are equivalent changes, may be made by any skilled in the art by using the above-mentioned technical contents without departing from the technical scheme scope of the present disclosure. However, all simple amendments, equivalent changes and modifications made to the above embodiments according to the technical essence of the present disclosure without departing from the technical scheme scope of the present disclosure all still fall within the protection scope of the present disclosure.

The invention claimed is:

1. An inner tub of a washing machine, comprising:
   a tub body;
   a balancing ring mounted at an upper part of the tub body;
   a tub bottom support mounted at a lower part of the tub body,
   wherein an annular necking structure, having an inside diameter smaller than that of the tub body is arranged on the tub body and positioned below the balancing ring;
   a plurality of dewatering holes distributed at the necking structure and between the necking structure and the balancing ring or between the necking structure and the balancing ring, and a portion of the tub body below the lowermost dewatering hole is a sealed water containing structure, wherein
   the necking structure is an annular inward bulge formed in a wall of the tub body and is concave from outside to inside, and
   from bottom to top, the inside diameter of the necking structure first decreases and then increases;

a disconnectable filtering cover arranged on an internal wall of the tub body and positioned below the necking structure, the disconnectable filtering cover including a main body and an auxiliary block which are independent from each other, the auxiliary block is arranged above the main body and below the necking structure and is located at the upper part of the inner tub; and a water passing gap is arranged between the auxiliary block and the main body for enabling water flow to pass through along a rotating direction of the inner tub.

2. The inner tub of the washing machine according to claim 1, wherein the dewatering holes are divided into at least two layers in an axial direction of the tub body, and a distribution density of an upper-layer dewatering holes is greater than that of the lower-layer dewatering holes.

3. The inner tub of the washing machine according to claim 2, wherein the dewatering holes are formed in an upper half part of the necking structure, or the dewatering holes are formed in an area above a part, with a minimum inside diameter, of the necking structure.

4. The inner tub of the washing machine according to claim 1, wherein the balancing ring is provided with an annular convex rib which bulges towards the outside, an upper end part of the necking structure turns up outwards and is in a wrapping connection with the annular convex rib, the dewatering holes are formed below the annular convex rib.

5. The inner tub of the washing machine according to claim 4, wherein the necking structure turns upwards and outwards at an uppermost side of the dewatering holes and is in wrapping connection with the annular convex rib.

6. The inner tub of the washing machine according to claim 1, wherein an annular rib which extends downward into the necking structure is arranged at the lower end of the balancing ring, a gap between the annular rib and the internal wall of the necking structure and forming a dewatering passage, and the dewatering holes are formed in the part of the necking structure, close to a top end of the dewatering passage.

7. The inner tub of the washing machine according to claim 6, wherein the dewatering passage comprises a plurality of longitudinally-arranged channels, and the dewatering holes are formed in an upper part of the channels.

8. The inner tub of the washing machine according to claim 7, wherein the channels are mainly formed in a manner that longitudinal ribs are matched with the necking structure, wherein the longitudinal ribs are longitudinally distributed on the annular rib.

9. The inner tub of the washing machine according to claim 1, wherein no dewatering hole is formed just above the filtering cover nor within an $\alpha$ range at each of two sides of the filtering cover, wherein $\alpha$ is greater than or equal to 0 degree and is smaller than or equal to 20 degrees.

10. The inner tub of the washing machine according to claim 1, wherein a lower end of the necking structure smoothly transitions to the internal wall of the tub body.

11. The inner tub of the washing machine according to claim 1, wherein a second dewatering hole is formed in the tub body and positioned behind the auxiliary block.

12. An inner tub of a washing machine, comprising:
a tub body;
a balancing ring support mounted at an upper part of the tub body;
a tub bottom mounted at a lower part of the tub body,
wherein an annular necking structure, of which an inside diameter is smaller than that of the tub body, is arranged on the tub body and positioned below the balancing ring;
a plurality of dewatering holes distributed at the necking structure and between the necking structure and the balancing ring, or between the necking structure and the balancing ring, and the tub body below the lowermost dewatering hole is of a sealed water containing structure, wherein
the necking structure is an annular convex rib arranged on the internal wall of the tub body along a circumference, and
from bottom to top, an inside diameter of the annular convex rib first decreases and then increases;
a disconnectable filtering cover arranged on an internal wall of the tub body and positioned below the necking structure, the disconnectable filtering cover including a main body and an auxiliary block which are independent from each other, the auxiliary block is arranged above the main body and below the necking structure and is located at the upper part of the inner tub; and
a water passing gap is arranged between the auxiliary block and the main body for enabling water flow to pass through along a rotating direction of the inner tub.

* * * * *